United States Patent [19]
Shackleton et al.

[11] Patent Number: 5,444,808
[45] Date of Patent: Aug. 22, 1995

[54] PLASTICS PACKAGED OPTICAL FIBRE AND METHOD OF MAKING SAME

[75] Inventors: Nigel Shackleton, Upper Cwmbran; Laura E. Pears, Sawbridgeworth, both of United Kingdom

[73] Assignee: Northern Telecom Limited, Montreal, Canada

[21] Appl. No.: 254,655

[22] Filed: Jun. 3, 1994

Related U.S. Application Data

[63] Continuation of Ser. No. 889,644, May 28, 1992, abandoned.

[30] Foreign Application Priority Data

Jun. 12, 1991 [GB] United Kingdom ............... 9112636

[51] Int. Cl.$^6$ ............... G02B 6/22; B05D 5/06; C03C 25/02
[52] U.S. Cl. ............... 385/128; 385/123; 385/141; 385/144; 385/127; 427/163.2; 65/385; 65/432
[58] Field of Search ............... 385/126, 127, 128, 123, 385/141, 144; 65/3.11, 3.4, 3.41, 3.44, 4.2, 385, 432; 427/163.2, 165

[56] References Cited

U.S. PATENT DOCUMENTS

| | | | |
|---|---|---|---|
| 4,243,298 | 1/1981 | Kao et al. ............... | 385/128 |
| 4,334,733 | 6/1982 | Takeshima et al. ............... | 385/128 |
| 4,443,657 | 4/1984 | Hill et al. ............... | 385/141 |
| 4,702,400 | 2/1978 | Claypoole et al. ............... | 385/128 X |
| 4,705,571 | 11/1987 | Lange et al. ............... | 385/128 X |
| 4,741,594 | 5/1988 | Suzuki ............... | 385/141 |
| 4,854,668 | 8/1989 | Mayr et al. ............... | 385/128 X |
| 5,011,260 | 4/1991 | Marx et al. ............... | 385/128 X |
| 5,062,685 | 11/1991 | Cain et al. ............... | 385/128 |
| 5,090,980 | 2/1992 | Clasen ............... | 385/123 |
| 5,146,531 | 9/1992 | Shustack ............... | 385/128 |
| 5,170,459 | 12/1992 | Norton ............... | 385/128 |
| 5,181,268 | 1/1993 | Chien ............... | 385/128 |

FOREIGN PATENT DOCUMENTS

| | | | |
|---|---|---|---|
| 0287016 | 4/1988 | European Pat. Off. ............... | 385/128 X |
| 2046625 | 1/1980 | United Kingdom ............... | 385/128 X |

OTHER PUBLICATIONS

Electronics and Communications in Japan, vol. 66, No. 6, Jun. 1983, N.Y. US pp. 45–51.
Patent Abstracts of Japan vol. 10, No. 52 Feb. 28, 1986.
Chemical Abstracts, vol. 101, No. 10, Sep. 1984, Columbus, Ohio.

*Primary Examiner*—Brian Healy
*Attorney, Agent, or Firm*—Brooks Haidt Haffner & Delahunty

[57] ABSTRACT

An optical fibre, comprising a glass core 10 surrounded by a glass cladding (11) of lower refractive index, is provided with inner and outer relatively high modulus plastics layers (12 and 14) spaced apart by a relatively low modulus layer 13. The low modulus layer is applied from an aqueous dispersion, and is dried but not sintered. This leaves the layer (13) in a form in which it has little adherence to the underlying inner plastics layer (12), thereby enabling the outer layer (14) to be readily peeled by mechanical means.

19 Claims, 1 Drawing Sheet

PLASTICS PACKAGED OPTICAL FIBRE AND METHOD OF MAKING SAME

This application is a continuation of application Ser. No. 07/889,644, filed May 28, 1992, now abandoned.

BACKGROUND OF THE INVENTION

This invention relates to plastics packaged glass optical fibres. Glass optical fibres, typically those made of fused silica, are normally provided with a plastics protective coating immediately after they are drawn from preform. A primary function of such a coating is to preserve, so far as is practically possible, the initial strength of the freshly drawn fibre by protecting its surface from chemical attack and from mechanical damage resulting from it being allowed to contact any solid surface other than that of the coating itself. Typically the application of the initial plastics protective coating is followed by the application of one or more further coatings of plastics material to produce a complete plastics packaged optical fibre. Not all of these further coatings are necessarily applied on-line with the drawing of fibre from preform. The thicknesses, moduli and expansion coefficients of the individual layers comprising the complete plastics packaging are normally chosen to provide mechanical buffering from the fibre and protection against micro-bending. A typical three-layer structure comprises an acrylate inner layer, a nylon outer layer and, between two layers, an intermediate layer of lower modulus material. Although described as a three-layer package, the acrylate layer may be a composite layer built up from two or more component sub-layers applied in succession, those sub-layers being of slightly different acrylate composition, and hence of slightly different modulus.

SUMMARY OF THE INVENTION

The present invention is concerned with plastics packaged glass optical fibre having an outer layer of plastics packaging spaced from an inner layer of plastics packaging by an intermediate layer of plastics packaging, and provides a structure having the property that the intermediate layer is not strongly adherent to the inner layer, thus facilitating the removal of the outer layer from the inner-by mechanical stripping so as to leave the inner layer intact on the underlying glass optical fibre. Mechanical strippability of this sort is a desirable feature in many applications in order to facilitate the preparation of fibre splices and terminations.

According to the present invention there is provided a plastics packaged glass optical fibre having an outer layer of plastics packaging spaced from an inner layer of plastics packaging by an unsintered dispersion deposited intermediate layer of plastics material.

The invention also provides a a method of providing an optical fibre with plastics packaging, in which method the fibre is provided with a plastics coating upon which another plastics coating is applied from an aqueous dispersion, wherein the dispersion is dried without producing a sintering of the residual material of the coating, and wherein a further coating is applied over the dried coating leaving the dried coating in its unsintered state.

BRIEF DESCRIPTION OF THE INVENTION

There follows a description of the manufacture of a plastics packaged glass optical fibre embodying the invention in a preferred form. The description refers to the accompanying drawings in which:

FIG. 1 is a schematic representation of a cross-section of the packaged fibre, and FIG. 2 is a schematic representation of the apparatus employed in the provision of the intermediate and outer plastics packaging layers of the fibre of FIG. 1.

DETAILED DESCRIPTION OF THE INVENTION

Figure 1:
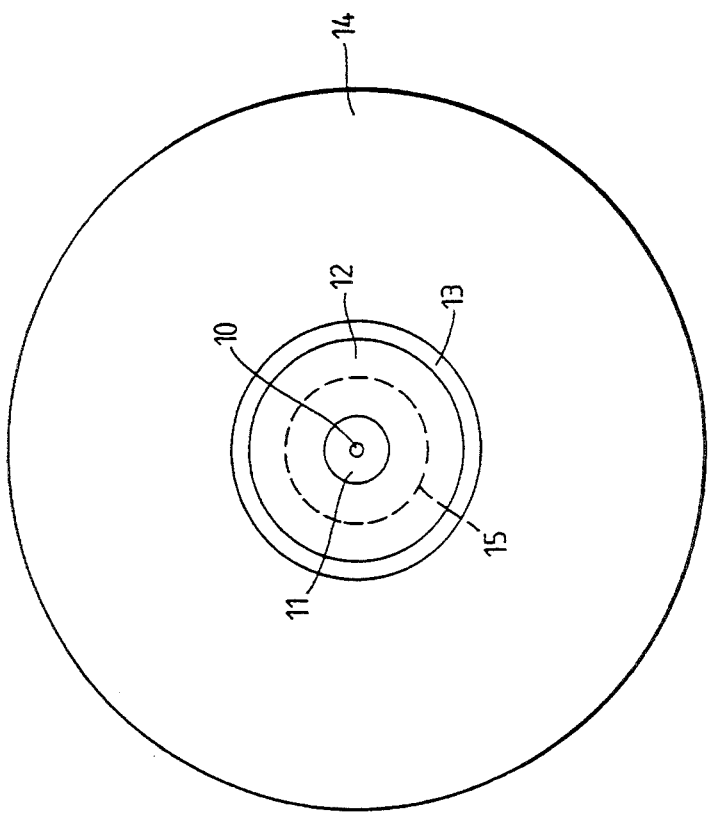

Referring to FIG. 1, a fused silica optical fibre consists of an optical core region 10 surrounded by a lower refractive index optical cladding region 11. This fibre, which typically has a diameter of 125 $\mu$m, is drawn from larger diameter optical fibre preform (not shown). Immediately after being drawn from the tip of the preform, and without first allowing it to come into any contact with a solid surface, the freshly drawn fibre is passed through one or more acrylate resin filled coating baths (not shown), and the applied resin is cured prior to collection of the fibre, for instance on a drum (not shown). The optical fibre, complete with its acrylate coating 12, now typically has a diameter of 250 $\mu$m.

Figure 2:
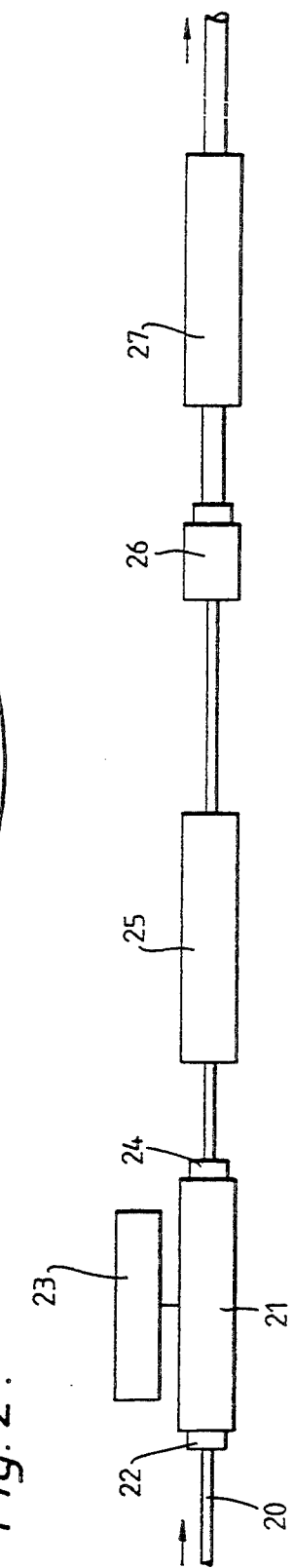

The optical fibre 10, 11, complete with its acrylate inner coating 12, is subsequently provided with an intermediate coating 13, and an outer coating 14, using the apparatus of FIG. 2. In FIG. 2, the fibre, complete with its acrylate coating, is depicted at 20 where it is about to be introduced into an applicator 21 via an entrance die 22. The applicator contains an aqueous dispersion of polytetrafluoroethylene (PTFE) at a pressure provided by a head of the dispersion contained in a reservoir 23. The fibre leaves the applicator 21 by way of an exit die 24, now coated with a thin layer of the aqueous dispersion of PTFE.

In a particular example the aqueous dispersion contained 55% PTFE with an 0.3 $\mu$m average particle size, and included a wetting agent to reduce surface tension and hence reduce any tendency for the coating to bead. The viscosity of this dispersion was 15 mPa.s. The head provided by the reservoir was about 10 cm. The two dies 22 and 24 had orifices 300 $\mu$m in diameter. The line speed was 40 meters per minute, and the thickness of the resulting wet dispersion coating was about 20 $\mu$m. At high line speeds the dispersion is liable to experience significant shear forces in the neighbourhood of the exit die orifice, and hence it is desirable to use a highly polished die made of a suitable material, such as tungsten carbide, that will minimise the risk of producing shear-induced coagulation of the dispersion.

The PTFE dispersion coated fibre proceeds a short distance, typically about 0.5 meters, after leaving the exit die before entering a drying oven 25. Typically this drying oven is about 1.5 meters long. Inside the oven, a current of hot air provides a temperature gradient designed to promote gradual evaporation of the aqueous medium to leave a low modulus particulate film 13 (FIG. 1) of PFTE about 10 um thick that will provide a cushion between the inner coating 12 and a yet-to-be-applied outer coating 14 (FIG. 1). The hot air flow is deliberately designed not to allow the temperature of the coating to reach 380° C. and thus allow the PTFE to begin to sinter. This is because such sintering would produce higher modulus material liable to be much more strongly adherent to the underlying coating 12. Furthermore, much more PTFE would be required to produce a fully coherent sintered layer.

After leaving the drying oven 25, the fibre now complete with its inner and intermediate plastics coatings 12 and 13 (FIG. 1), proceeds a further short distance, typically about 1.5 meters, before entering a melt-extruder 26 containing nylon for the outer coating 14 of the plastics packaging. On emerging from the melt-extruder, the fibre, now complete with its inner intermediate and outer plastics packaging layers 12, 13 and 4, and typically having a diameter of about 0.8 mm, enters a cooling trough 27 before being taken up on a drum (not shown). The cooling provided by the cooling trough 27 is regulated to produce the required amount of crystallinity in the nylon and hence the appropriate thermal expansion properties to give the package fibre its required strength without inducing excessive microbending losses over the required service temperature range.

The resulting optical fibre package is a tight jacketed fibre whose outer layer is readily strippable by mechanical means.

In a preferred construction the inner acrylate coating 12 has a composite structure with an outer sub-layer surrounding an inner sub-layer of lower modulus than the outer sub-layer, the boundary between these two layers being indicated in FIG. 1 by the broken line 15.

It is to be clearly understood that the invention is not limited in its application solely to the specific plastics materials exemplified in the foregoing specific example. Thus an aqueous dispersion of FEP (fluorinated ethylene propylene) can be used in place of the aqueous dispersion of PTFE as the material from which to make the intermediate coating, and similarly an alternative high performance thermoplastics material, such as a polyester polyether or a liquid crystal polymer, can be used in place of the nylon of the outer coating.

We claim:

1. A method of providing an optical fibre with plastic packaging, in which method the fibre is provided with a plastics coating upon which another plastics coating is applied from an aqueous dispersion, wherein the dispersion is dried without producing a sintering of the residual material of the coating and wherein a further coating is applied over the dried coating leaving the dried coating in its unsintered state.

2. A method as claimed in claim 1, wherein the aqueous dispersion is an aqueous fluoropolymer dispersion.

3. A method as claimed in claim 2, wherein said fluoropolymer is PTFE.

4. A method as claimed in claim 2, wherein said fluoropolymer is FEP.

5. A plastics packaged glass optical fiber having an outer layer of plastics packaging spaced from an inner acrylate layer of plastics packaging by an unsintered dispersion deposited intermediate layer of plastics material, said inner acrylate plastics layer being a composite layer having sub-layers of different modulus.

6. A plastic packaged optical fiber product produced by the following method:
 coating the fiber with a first coating of plastics material;
 applying a second plastics coating over said first coating from an aqueous dispersion;
 drying said second plastics coating without causing sintering of the residual material of said second coating; and
 after said second plastics coating is dried, applying a third coating over said second plastics coating while leaving said second plastics coating in its unsintered state.

7. A plastics packaged glass optical fiber having an outer layer of plastics packaging spaced from an inner acrylate layer of plastics packaging by an unsintered dispersion deposited intermediate layer consisting essentially of plastics material, said inner acrylate plastics layer being a composite layer having sub-layers of different modulus.

8. A plastics packaged optical fibre as claimed in claim 7, wherein said plastics material of said intermediate layer is a fluoropolymer.

9. A plastics packaged optical fibre as claimed in claim 8, wherein said fluoropolymer is PTFE.

10. A plastics packaged optical fibre as claimed in claim 8, wherein said fluoropolymer is FEP.

11. A plastics packaged optical fibre as claimed in claim 7, wherein the plastics material of said outer layer is nylon.

12. A plastics packaged optical fibre as claimed in claim 7, wherein said inner plastics layer is an acrylate layer.

13. A plastics packaged optical fiber product produced by the following method:
 coating the fiber with a first coating of plastics material;
 applying a second coating of a plastics material over said first coating by coating said first coating with a dispersion consisting essentially of the plastics material of said second coating and water;
 drying said second coating without causing sintering of the residual material of said second coating; and
 after said second coating is dried, applying a third coating over said second coating while leaving said second coating in its unsintered state.

14. A plastics packaged optical fiber as claimed in claim 13, wherein said dispersion includes a wetting agent.

15. A method of providing an optical fibre with plastics packaging, in which method the fibre is provided with a first plastics coating upon which a second coating of a plastics material is applied from a dispersion consisting essentially of said plastics material dispersed in water, wherein the dispersion is dried without producing a sintering of the residual material of said second coating, and wherein a third plastics coating is applied over the dried coating leaving the dried coating in its unsintered state.

16. A method as claimed in claim 15, wherein said dispersion includes a wetting agent.

17. A method as claimed in claim 15, wherein said dispersion is an aqueous fluoropolymer dispersion.

18. A method as claimed in claim 17, wherein said fluoropolymer is PTFE.

19. A method as claimed in claim 17, wherein said fluoropolymer is FEP.

* * * * *